United States Patent
Saito et al.

(10) Patent No.: US 6,438,997 B1
(45) Date of Patent: Aug. 27, 2002

(54) METHOD OF ELONGATING GLASS PREFORM

(75) Inventors: Tatsuhiko Saito; Tomomi Moriya, both of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/535,531

(22) Filed: Mar. 27, 2000

Related U.S. Application Data

(63) Continuation-in-part of application No. PCT/JP98/03891, filed on Sep. 1, 1998.

(30) Foreign Application Priority Data

Sep. 26, 1997 (JP) .............................................. 9-262191

(51) Int. Cl.[7] .............................................. C03B 37/07
(52) U.S. Cl. .............................. 65/382; 65/381; 65/411; 65/435; 65/491; 65/29.14
(58) Field of Search ............................ 65/382, 381, 411, 65/435, 491, 29.14

(56) References Cited

U.S. PATENT DOCUMENTS

| | | | |
|---|---|---|---|
| 5,443,610 A | * | 8/1995 | Urruti |
| 5,551,967 A | * | 9/1996 | Urruti |
| 5,755,849 A | * | 5/1998 | Hoshino et al. |
| 5,942,019 A | * | 8/1999 | Saito et al. |
| 6,178,778 B1 | * | 1/2001 | Kenmochi et al. |
| 6,220,057 B1 | * | 4/2001 | Yamamura et al. |

FOREIGN PATENT DOCUMENTS

| | | |
|---|---|---|
| GB | 2307907 | 6/1997 |
| JP | 61-295250 | 12/1986 |
| JP | 61-295251 | 12/1986 |
| JP | 61-295252 | 12/1986 |
| JP | 8-91861 | 4/1996 |

* cited by examiner

*Primary Examiner*—Michael Colaianni
(74) *Attorney, Agent, or Firm*—McDermott, Will & Emery

(57) ABSTRACT

In a method of elongating a glass preform comprising the steps of holding both ends of the glass preform $1a$ with a first holding section 2 and a second holding section 3, respectively; moving the first holding section 2 and the second holding section 3 in a longitudinal direction of the glass preform $1a$ with the moving speed of the first holding section 2 faster than that of the second holding section 3 and, at the same time, heating and softening the glass preform $1a$ by a heating section 4 successively; and elongating the glass preform $1a$ by a tensile force applied thereto, so as to form an elongated body $1c$; an electric furnace is employed in the heating section 4; and said method further comprising the steps of setting a reference value R1 with respect to an outside diameter at a specific position $1d$ in a tapered region $1b$ in the glass preform $1a$ in the process of elongating; acquiring an actually measured value R2 at the specific position $1d$; and controlling the moving speed of the first holding section 2 and/or second holding section 3 according to a value (R2/R1) obtained from the reference value R1 and actually measured value R2.

10 Claims, 2 Drawing Sheets

METHOD OF ELONGATING GLASS PREFORM

RELATED APPLICATIONS

This is a Continuation-In-Part application of International Patent Application Ser. No. PCT/JP98/03891 filed on Sep. 1, 1998, now pending.

BACKGROUND OF THE INVENTION

1. Filed of the Invention

The present invention relates to a method of elongating a glass preform for optical fiber.

2. Related Background Art

When making an optical fiber, in a step of disposing a cladding layer outside a core or a step of drawing the optical fiber as a final product, it is necessary to elongate a glass preform, which is an intermediate product of the optical fiber, to a predetermined outside diameter. As a method of precisely elongating the :glass preform for such a purpose, there have conventionally been known methods by use of a burner elongating machine disclosed in Japanese Patent Application Laid-Open No. 61-295,251 or No. 61-295,252. In these method, both end s of the glass preform are held with chucks, and these chucks are moved with a different speed while a part of the glass preform is heated and softened by the burner, so as to elongate the glass preform by a tensile force applied thereto. In these methods, the outside diameter in the tapered region of the glass preform in the process of elongating is measured, and the moving speeds of chucks are changed according to the difference between thus actually measured outside diameter and a preset outside diameter, i.e. outside diameter deviation, so as to carry out precision elongating to yield an elongated body with a predetermined outside diameter.

In the elongating methods disclosed in the above-mentioned Japanese Patent Application Laid-Open No. 61-295,251 or No. 61-295,252, however, since the moving speeds of the chucks (chuck speeds) are changed according to the outside diameter deviation, the chuck speeds would be changed by a certain specific ratio, regardless of the magnitude of the preset outside diameter, when a certain particular outside diameter deviation occurs. For example, even in the cases with different preset outside diameters of 50 mm and 100 mm, their amounts of change in chuck speeds would be identical to each other when the same outside diameter deviation of 1 mm occurs. The deviation of 1 mm at the preset outside diameter of 50 mm is 2% in terms of ratio, whereas the deviation of 1 mm at the preset outside diameter of 100 mm is 1% in terms of ratio, whereby their influences upon the elongated body would differ from each other by a factor of 2, whereas the amount of control of chuck speed for correcting the deviation would be kept constant. Consequently, there has been a problem that, when preset outside diameters are different from each other, a difference may occur between effects obtained after the chuck speed control. Though this problem can be coped with by reviewing the control system every time when the preset outside diameter is changed, it requires an operation of modifying the control system on each occasion, thus being troublesome.

Also, in the elongating methods disclosed in the above-mentioned Japanese Patent Application Laid-Open No. 61-295,251 or No. 61-295,252, the glass preform is heated and softened by a burner[00ab] Since the heating with a burner can be effected locally, it can narrow the melted area, thus being suitable for precision elongating. However, it cannot yield a sufficient amount of heat for softening a glass preform having a large outside diameter. Therefore, the glass preform having a large outside diameter has been elongated by an electric furnace elongating machine using such as a resistance furnace or induction furnace which can yield a sufficient amount of heat, to such an outside diameter that it can be precision-elongated by a burner elongating machine, and then has further been precision-elongated by the burner elongating machine.

Such a method, however, has been problematic in that a glass preform having such a large outside diameter that it cannot be elongated by a burner elongating machine cannot directly be precision-elongated, and in that two steps are employed, thereby necessitating time and cost upon making. In the extension by use of an electric furnace elongating machine, the heated and softened part becomes wider as compared with that obtained by a burner elongating machine, thus making it difficult to carry out the extension so as to yield a predetermined outside diameter. Therefore, the precision elongating has not yet been carried out by use of an electric furnace elongating machine alone.

SUMMARY OF THE INVENTION

As a result of diligent studies, the inventors have found that, by controlling extension process according to a specific value obtained from a reference outside diameter in a tapered region elongated by heating and softening and an actually measured one, precision elongating can be carried out by an electric furnace elongating machine alone even when the outside diameter of the glass preform before extension and the target elongated outside diameter vary, whereby the above-mentioned problems can be overcome. Based on this finding, it is an object of the present invention to provide a method of elongating a glass preform which can precision-expand the glass preform with a favorable accuracy and a favorable manufacturing efficiency regardless of the glass preform outside diameter and the target elongated outside diameter.

The method of elongating a glass preform in accordance with the present invention comprises the steps of holding both ends of the glass preform with first and second holding sections, respectively; with the moving speed of the first holding section faster than that of the second holding section; heating and softening the glass preform by a heating section successively from the end portion on the first holding section side as the first and second holding sections move in the longitudinal direction of the glass preform; and elongating the glass preform by means of a tensile force applied to the glass preform. In this method, an electric furnace is employed in the heating section. And the method further comprises the steps of setting a reference value R1 with respect to an outside diameter at a specific position in a tapered region of the glass preform in the process of elongating, acquiring an actually measured value R2 which is an outside diameter at the specific position and controlling the moving speeds of the first holding section and/or second holding section according to a value (R2/R1) obtained from the reference value R1 and actually measured value R2.

In the present invention, the moving speed of the first holding section and/or second holding section is not controlled by the difference between the reference value R1 and actually measured value R2 in the tapered region, i.e., the so-called outside diameter deviation, but by a value (R2/R1) obtained from the reference value R1 and actually measured value R2. Consequently, with respect to any preset outside diameter, the control is carried out by using the ratio of amount of fluctuation in the preset outside diameter, whereby more precise extension can be effected. Though it has conventionally been difficult to carry out precise extension by use of an electric furnace elongating machine alone, it can be effected by the above-mentioned method, whereby precision elongating can be performed by the electric furnace elongating machine alone, thus making it possible to precision-expand a glass preform having a greater outside diameter in a single step. Based on the above-mentioned value, proportional control, differential control, and integral control can be effected in combination.

Preferably, the moving speed-of the first holding section and/or second holding section is controlled according to the following expression (I), (II):

$$Vd/Ud = (R2/R1)^K \tag{I}$$

$$Vu/Uu = (R2/R1)^{-K} \tag{II}$$

Here, Vd is a target moving speed [mm/min] of the first holding section under control, Ud is a preset moving speed [mm/min] of the first holding section, Vu is a target moving speed [mm/min] of the second holding section under control, Uu is a preset moving speed [mm/min] of the second holding section, and K is a control coefficient (any positive constant).

When the respective moving speeds of the individual holding sections are controlled by these expressions, precise extension can favorably be effected by use of the electric furnace elongating machine even when the glass preform outside diameter before extension and the target elongated outside diameter vary.

Also, the method of elongating a glass preform in accordance with the present invention may be characterized in that the target moving speed of the first holding section and/or second holding section is controlled according to a value [(R2/R1)−1] obtained from the reference value R1 and actually measured value R2.

The precision elongating by use of an electric furnace elongating machine can favorably be carried out regardless of the outside diameter of the glass preform in this case as well. In particular, it is advantageous in that feedback can be effected rapidly. Based on the above-mentioned value, proportional control, differential control, and integral control can be effected in combination.

Here, it is preferred that the target moving speed of the first holding section and/or second holding section be controlled according to the following expression (III), (IV). The respective meanings of individual symbols are similar to those in the case of the above-mentioned expression (I), (II).

$$Vd/Ud = 1 + K[(R2/R1)-1] \tag{III}$$

$$Vu/Uu = 1 - K[(R2/R1)-1] \tag{IV}$$

Expressions (III) and (IV) are obtained by subjecting the above-mentioned expressions (I) and (II) to Taylor's expansion, respectively, and then omitting the resulting quadratic and higher-order terms. When the respective target moving speeds of the individual holding sections are controlled by such expressions, then precision elongating by use of an electric furnace elongating machine can favorably be carried out regardless of the outside diameter of the glass preform. Further, since the control expressions are not represented by functions of powers of (R2/R1) but by simple linear functions, arithmetic operations concerning the control ca[008e] be carried out rapidly, whereby feedback can be performed promptly.

Preferably, the above-mentioned control coefficient K in expressions (I) to (IV) is set to a value within the range of 50 to 500. As a result, the amount of fluctuation in outside diameter of the manufactured elongated body can be made smaller, whereby an optical, fiber having a more uniform outside diameter can be obtained. If the control coefficient K is less than 50, the amount of change in the target moving speed (hereinafter also referred to as target speed) Vd, Vu will be so small that effective results may not be obtained by the control, thus increasing, on the contrary, the amount of change in outside diameter of the elongated body manufactured. If the control coefficient exceeds 500, by contrast, though the amount of fluctuation in outside diameter in the tapered region of the glass preform in the process of elongating can be made more constant, the amount of fluctuation in outside diameter of the manufactured elongated body may increase, on the contrary, under the influence of the unevenness in outside diameter inherent in the glass preform. In the above-mentioned range, it is particularly preferred that the control coefficient K be within the range of 100 to 250. Within the latter range, the amount of, fluctuation in outside diameter of the manufactured elongated body can be made very small.

Also, it is preferred that the target speed Vd is restricted so as to fall within the range represented by the following expression (V):

$$(100-X1)Ud < 100Vd < (100+X1)Ud \tag{V}$$

where X1 is any constant within the range of 10 to 100.

When the target speed Vd is set so as to fall within a predetermined range with respect to the preset speed Ud, then the outside diameter of the elongated body manufactured can be prevented from failing to diverge. Specifically, if the target speed Vd calculated by the above-mentioned expression (I) or (III) is lower than the lower limit of the restriction range, then the lower limit value of the restriction range is employed as the target speed Vd; whereas, if it exceeds the upper limit of the above-mentioned restriction range, then the upper limit value of the restriction range is employed as the target speed Vd.

Here, if the target speed Vd is restricted such that X1<10, then there occurs a state where the target speed Vd hardly changes with respect to the preset speed Ud, thereby failing to yield effective results by control and increasing, on the contrary, the amount of change in outside diameter of the elongated body manufactured. If the target speed Vd is restricted such that X1>100, by contrast, then the target speed Vd varies too much, so that the control system diverges (overshoots), whereby the outside diameter of the elongated body manufactured would not converge at a predetermined value.

Similarly, it is preferred that the target speed Vu is restricted so as to fall within the range represented by the following expression (VI):

$$(100-X2)Uu < 100Vu < (100+X2)Uu \tag{VI}$$

where X2 is any constant within the range of 10 to 100.

Consequently, in totally the same manner as in the above-mentioned case of the first holding section, the target speed Vu is set within a predetermined range with respect to the preset speed Uu, whereby the outside diameter of the elongated body manufactured is prevented from failing to diverge. Here, X1 and X2 can be determined independently from each other.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 2A and 2B are side views each showing a relationship between the outside diameter at a specific position in a tapered region and the outside diameter of an elongated body, wherein FIG. 2A shows a case keeping the outside diameter at the specific position in the tapered region at constant diameter, whereas FIG. 2B shows a case keeping the the outside diameter of the elongated body at constant diameter.

DESCRIPTION OF THE PREFERRED EMBODIMENTS

First, an embodiment of an elongating machine for carrying out the method of making a glass preform in accordance with the present invention will be explained with reference to FIG. 1.

Figure 1:
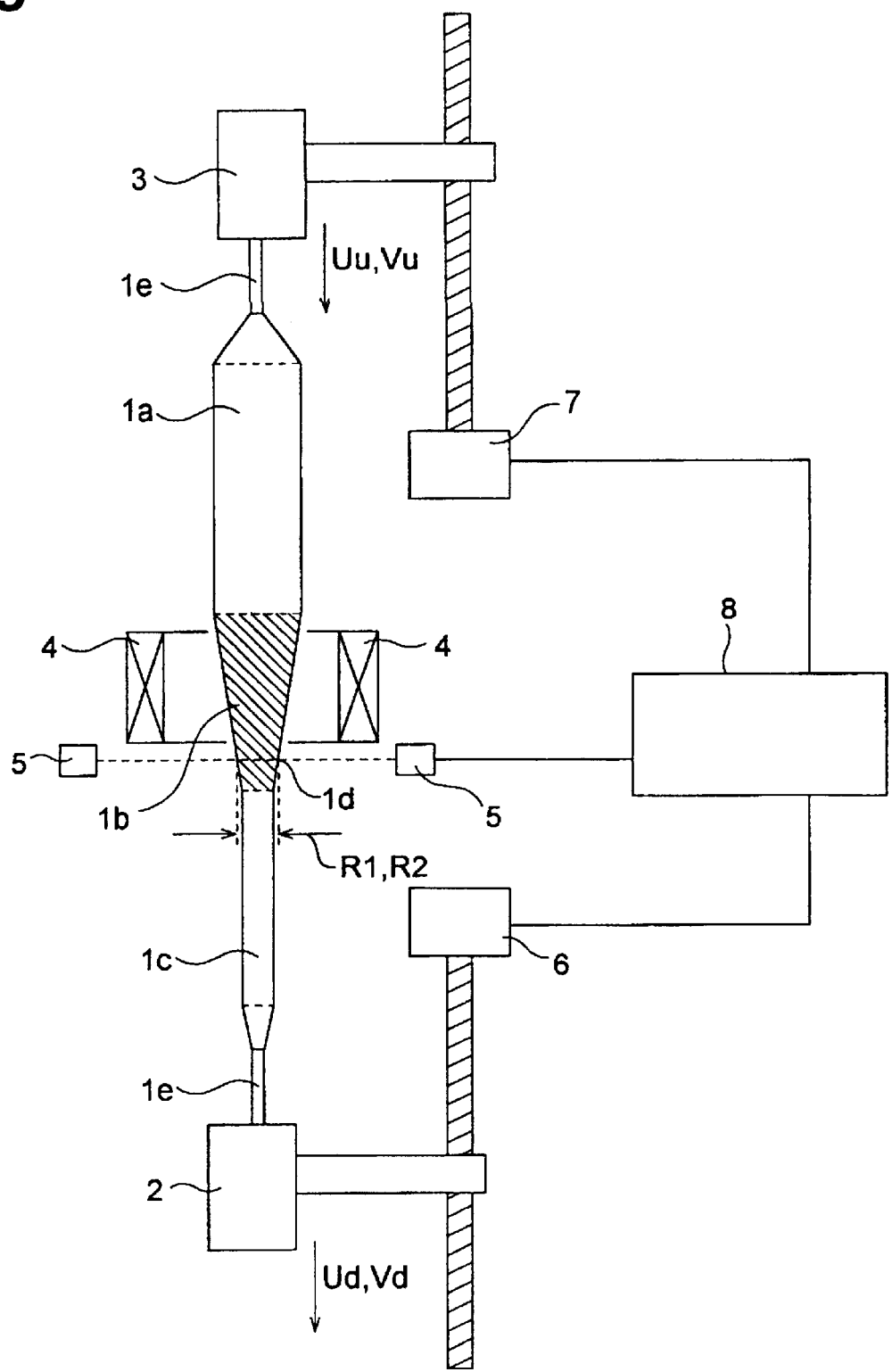
FIG. 1 is a side view of an elongating machine for carrying out the method of elongating a glass preform in accordance with the present invention.

FIG. 1 shows a glass preform 1a in the process of elongating, which is in the state where the vicinity of the center of the glass preform 1a is heated and softened by an electric heater 4, and is elongated at a tapered region 1b, so as to form an elongated body 1c therebelow. There is only the glass preform 1a at the initial stage of extension, the tapered region 1b is formed when the extension is started, and the elongated body 1c is formed therebelow.

The upper end of the glass preform 1a and the lower end of the elongated body 1c are formed with dummy rods 1e, respectively, whereas the dummy rods 1e are chucked by a first holding section 2 and a second holding section 3, respectively. The first holding section 2 and the second holding section 3 are connected to driving motors 6 and 7, and are driven up and down in the drawing by the driving motors 6 and 7. The driving motors 6 and 7 are connected to a control unit 8, and change the speeds of the first holding section 2 and second holding section 3 according to signals from the control unit 8.

The electric heater 4 is disposed halfway between the first holding section 2 and second holding section 3. The electric heater 4 has a cylindrical form, and heats and softens the glass preform 1a inserted therein at the center thereof. Employable as the electric heater 4 is a heater using the heating caused by an electric resistance or an induction coil using high-frequency induction heating. Disposed near and below the electric heater 4 is a noncontact type outside diameter meter 5 for measuring the outside diameter, at a specific position 1d, of the tapered region 1b heated and softened as being inserted in the electric heating 4.

When extension is carried out by use of the above-mentioned elongating machine, the first holding section 2 and the second holding section 3 are moved down by the driving motors 6 and 7, each receiving a signal from the control unit 8, respectively. Here, a reference preset speed Ud is set beforehand as the moving speed of the first holding section 2, whereas a reference preset speed Uu is set beforehand as the moving speed of the second holding section 3. The moving speed of the first holding section 2 is set faster than that of the second holding section 3, thus yielding a speed difference which applies a tensile force to the glass preform 1a, the tapered region 1b, and the elongated body 1c.

The intermediate portion of the glass preform 1a and elongated body 1c is inserted into the electric heater 4, so as to form the tapered region 1b softened by the amount of heat given by the electric heater 4. The tapered region 1b is elongated while being shaped into a tapered form as being drawn by the tensile force applied thereto. The tapered region 1b in the heated and softened state is formed in the area (hatched area in FIG. 1) ranging from slightly above the upper end of the electric heater 4 to a position slightly below the lower end of the electric heater 4.

Though the tapered region 1b is allowed to elongate in a softened state for a predetermined distance even after exiting the electric heater 4, it is solidified thereafter so as to become the elongated body 1c. The actual outside diameter (actually measured value R2) at the specific position in the tapered region 1b near the lower end thereof is measured by the outside diameter meter 5. With respect to the specific position 1d, a reference value R1 which becomes a reference is set beforehand. Since the outside diameter of the elongated body 1c is controlled according to the actually measured value R2 at the specific position 1d, it is preferred that the specific position 1d be located near the elongated body 1c. If it is too far below the lower end of the electric heater 4, however, the outside diameter of the elongated body 1c cannot be held constant due to a control delay. The distance between the specific position id and the lower end of the electric heater 4 is preferably set to 70 to 150 mm, more preferably to 90 to 120 mm. The actually measured value R2 at the specific position 1d is fed to the control unit 8, whereby the moving speed of the first holding section 2 and/or second holding section 3 is controlled according to the actually measured value R2 at the specific position 1d.

An embodiment of the method of elongating a glass preform in accordance with the present invention will now be explained in detail. Though the following explanation relates to a case where the moving speeds of both of the first holding section 2 and second holding section 3 are controlled, one of them may be controlled alone.

The actually measured value R2 at the specific position id measured by the outside diameter meter 5 is fed to the control unit 8. Within the control unit 8, an arithmetic operation is carried out according to the reference value R1 at the specific position 1d, the respective preset speeds Ud and Uu of the first holding section 2 and second holding section 3, and the control coefficient K. As a result, the respective target speeds Vd and Vu of the first holding section 2 and second holding section 3 are calculated from the following expressions (I) and (II) based on a value (R2/R1) obtained from the reference value R1 and actually measured value R2.

$$Vd/Ud = (R2/R1)^K \qquad (I)$$

$$Vu/Uu = (R2/R1)^{-K} \qquad (II)$$

Alternatively, the respective target speeds Vd and Vu of the first holding section 2 and second holding section 3 may be calculated from, instead o[0086] expressions (I) and (II), the following expressions (III) and (IV), based on a value [(R2/R1)−1] obtained from the reference value R1 and actually measured value R2, which are yielded by subjecting expressions (I) and (II) to Taylor's expansion with respect to the value [(R2/R1)−1], respectively, and then omitting the resulting quadratic and higher-order terms. In this case, since the control expressions are not represented by functions of powers of (R2/R1) but by simple linear functions, arithmetic operations concerning the control can be carried out rapidly, whereby feedback can be performed promptly.

$$Vd/Ud=1+K[(R2/R1)-1] \qquad \text{(III)}$$

$$Vu/Uu=1-K[(R2/R1)-1] \qquad \text{(IV)}$$

If the speeds of the first holding section 2 and second holding section 3 are controlled according to the difference (outside diameter deviation) between the preset outside diameter and the actually measured outside diameter, the same control will be carried out as long as the outside diameter deviation is 1 mm whether the preset outside diameter is 50 mm or 100 mm. The outside diameter deviation of 1 mm at the preset outside diameter of 50 mm is 2% in terms of ratio, whereas the outside diameter deviation of 1 mm at the preset outside diameter of 100 mm is 1% in terms of ratio. Therefore, even when their outside diameter deviation is identically 1 mm, the outside diameter with the preset outside diameter of 50 mm fluctuates twice as much as that with the preset outside diameter of 100 mm, whereas the moving speeds of the first holding section 2 and second holding section 3 would be controlled similarly in both cases.

When the moving speeds of the first holding section 2 and second holding section 3 are, controlled by (R2/R1) or [(R2/R1)−1] as mentioned above, by contrast, then the control in proportion to the ratio of amount of fluctuation in the reference value R1 is carried out, whereby stable control can be performed regardless of the outside diameter of the glass preform before extension or the target elongated outside diameter. As a result, more precise extension can be carried out, thereby enabling precision elongating by use of an electric furnace elongating machine alone, which has conventionally been difficult, thus making it possible to precision-expand the glass preform 1a having a greater outside diameter in a single step.

Here, as the control coefficient K is greater, the amount of change in speed Vd, Vu after control with respect to the preset speed Ud, Uu becomes greater, whereby the outside diameter at the specific position 1d can be held more uniform. The control coefficient K is set to any constant value within the range of 50 to 500. The following table shows a relationship between the control coefficient K and the amount of fluctuation in outside diameter of the elongated body manufactured. Here, a glass preform having an average outside diameter of 80 mm was used, the target elongated outside diameter of the elongated body 1c was set to 40 mm, the specific position 1d for measuring the outside diameter was set to a position separated from the lower end of the heater by 90 mm, the reference value R1 of the outside diameter of the tapered region at this position was 46 mm, the preset speed Ud of the first holding section 2 was 40 mm/min, the preset speed Uu of the second holding section 3 was 10 mm/min, the control permissible range of the first holding section 2 with respect to the preset speed Ud was ±30% (X1=30), and only the moving speed of the first holding section 2 was controlled by expression (III).

| Control Coeff. K | Outside diameter fluctuation amount at specific position in tapered region [mm] | Outside diameter fluctuation amount of elongated body [mm] |
| --- | --- | --- |
| 25 | ±0.100 | ±1.5 |
| 50 | ±0.050 | ±0.6 |
| 100 | ±0.030 | ±0.3 |
| 250 | ±0.015 | ±0.3 |
| 500 | ±0.010 | ±0.5 |
| 1000 | ±0.005 | ±1.2 |

If the control coefficient is less than 50, then the amount of change in target speed Vd, Vu with respect to the preset speed Ud, Uu becomes so small that effective results cannot be obtained by the control, whereby the amount of change in outside diameter of the elongated body 1c becomes greater. If the control coefficient K exceeds 500, by contrast, while the amount of fluctuation at the specific position 1d becomes smaller (outside diameter becomes more uniform), the amount of change in outside diameter of the elongated body 1c formed below the specific position 1d has a stronger tendency to become greater, on the contrary, under the influence of the unevenness in outside diameter inherent in the glass preform 1a.

Figure 2A:
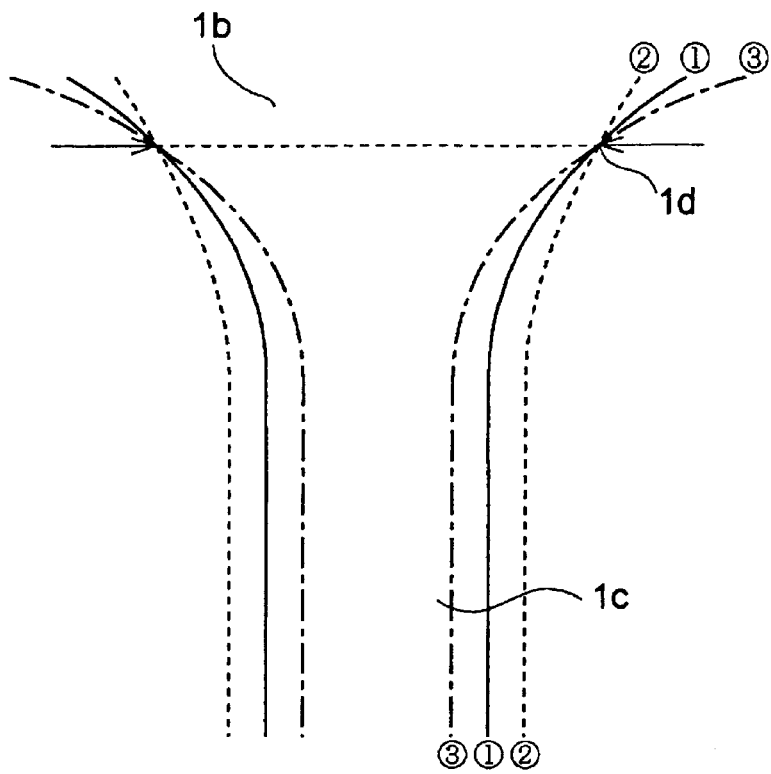

Namely, as shown in FIG. 2A, if the outside diameter of the glass preform 1a conforms t the reference, then the tapered region 1b formed therebelow attains an ideal form as indicated by $\hat{1}$ in the drawing. However, the glass preform 1a itself may fluctuate its outside diameter, whereby the outside diameter on the upper side of the tapered region 1b becomes smaller as indicated by $\hat{2}$ in the drawing in the part where the outside diameter of the glass preform 1a is smaller than the reference. Here, if the control coefficient K is made greater, so as to improve the evenness in outside diameter at the specific position 1d in excess, the outside diameter of the elongated body 1c formed therebelow becomes greater as indicated by $\hat{2}$ in the drawing. In the part where the outside diameter of the glass preform 1a is greater than the reference, by contrast, the outside diameter of the tapered region on the upper side becomes greater as indicated by $\hat{3}$ in the drawing. Here, if the control coefficient K is made greater, so as to improve the evenness in outside diameter at the specific position id in excess, the outside diameter of the elongated body 1c formed therebelow becomes smaller as indicated by $\hat{3}$ in the drawing.

Figure 2B:
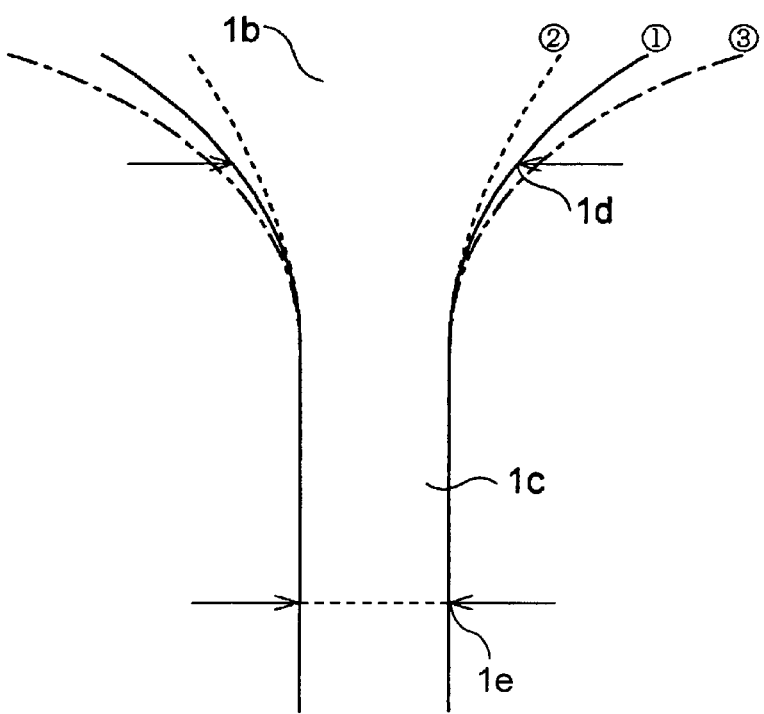

On the other hand, the amount of fluctuation in outside diameter of the elongated body 1c can be suppressed to a low level when the control coefficient K is set small than the above mentioned so as to make worse the evenness in outside diameter at the specific position 1d. Namely, as shown in FIG. 2B, if the outside diameter of the glass preform 1a conforms to the reference, then the tapered region 1b and elongated body 1c formed in the lower part thereof attain an ideal form as indicated by $\hat{1}$ in the drawing. Here, in the part where the outside diameter of the glass preform 1a is smaller than the reference, even if the outside diameter at the specific position 1d is slightly smaller than that of the ideal form as indicated by $\hat{2}$ in the drawing, the outside diameter of the elongated body 1c formed therebelow will not be smaller than that in the ideal form, whereby it will be substantially identical to that indicated by $\hat{1}$ in the drawing at a position 1e and therebelow. Also, in the part where the outside diameter of the glass preform 1a is greater than the reference, even if the outside diameter at the specific position 1d is slightly greater than that of the ideal form as indicated by 3̂ in the drawing, the outside diameter of the elongated body 1c formed therebelow will not be greater than that in the ideal form, whereby it will be substantially identical to that indicated by 1̂ in the drawing at the position 1e, and therebelow. Here, FIGS. 2A and 2B are indicated with their ratios in the vertical or horizontal direction being exaggerated as compared with those in practice in order to facilitate the understanding thereof.

For the above-mentioned reason, if the value of control coefficient K is too large or, on the contrary, too small, then the amount of fluctuation in outside diameter of the elongated body 1c will increase. As a result of diligent studies, the inventors have found it preferable for the control coefficient K to fall within the range of 50 to 500 in order to suppress the fluctuation in outside diameter of the elongated body 1c to a low level. Also, in the above-mentioned range, it is particularly preferred that the control coefficient K be within the range of 100 to 250, since the amount of fluctuation in outside diameter of the elongated body 1c can be made more uniform thereby. This fact is apparent from the above-mentioned table as well. These preferred ranges for the control coefficient K can suitably be employed in any of the above-mentioned expressions (I) and (II) and expressions (III) and (IV) resulting from Taylor's expansion of the former expressions.

Further, the target speed Vd of the first holding section 2 is restricted so as to fall within the range represented by the following expression (V). Here, X1 is any constant within the range of 10 to 100.

$$(100-X1)Ud < 100Vd < (100+X1)Ud \quad (V)$$

As mentioned above, by controlling the speeds of the first holding section 2 and second holding section 3 by means of expressions (I) to (IV) (preferably with the control coefficient K being set to a constant within the range of 50 to 500), the amount of fluctuation in outside diameter of the elongated body 1c can be made small. In the case where the outside diameter of the glass preform 1a fluctuates greatly or the like, the target speed Vd of the first holding section 2 would be controlled to a value considerably far from the preset value Ud, whereby,the target speed Vd of the first holding section 2 becomes extremely slow or extremely fast. In the glass preform 1a, the most softened part within the electric heater 4 caused by heating is the most susceptible to this control, and it takes time for this part to reach the specific position 1d. Consequently, a time delay for control inevitably occurs in such a control system. Under the condition where Vd is extremely changed, such a control delay is repeated, whereby a tendency for the outside diameter of the elongated body 1c to diverge, (overshoot) without converging at a predetermined value becomes remarkable.

As a consequence, the target speed Vd of the first holding section 2 is restricted to the predetermined range indicated by expression (V) with respect to the preset speed Ud, whereby the outside diameter of the elongated body 1c is prevented from diverging. As can also be seen from the fact that X1 is any constant between 10 to 100, the range acquirable by the target speed Vd is restricted such that the absolute value |Vd−Ud| of the difference between the target speed Vd and preset speed Ud is limited to the range of 10% to 100% of the preset speed Ud. If the target speed Vd calculated from the above-mentioned expression (I) or (III) is lower than the lower limit of the above-mentioned restriction range, then it is controlled by the lower limit value of the restriction range; whereas, if it exceeds the upper limit of the above-mentioned restriction range, then it is controlled by the upper limit value of the restriction range. For example, in the case where X1=10, the target speed Vd is restricted such that (speed at 90% of the preset speed Ud)<(target speed Vd)<(speed at 110% of the preset speed Ud); whereas, in the case where X1=100, the target speed Vd is restricted such that (speed at 0% of the preset speed Ud, i.e., 0)<(target speed Vd)<(speed at 200% of the preset speed Ud).

The following table shows a relationship between the ratio of control permissible range (X1) with respect to the preset speed of holding section and the amount of fluctuation in outside diameter of the manufactured elongated body.

Here, a glass preform having an average outside diameter of 80 mm was used, the target elongated outside diameter of the elongated body 1c was set to 40 mm, the specific position 1d for measuring the outside diameter was set to a position separated from the lower end of the heater by 90 mm, the reference value R1 of the outside diameter of the tapered region at this position was 46 mm, the preset speed Ud of the first holding section 2 was 40 mm/min, the preset speed Uu of the second holding section 3 was 10 mm/min, the control coefficient K was 250, and only the moving speed of the first holding section 2 was controlled by expression (III).

| Ratio of control permissible range to preset moving speed of holding section [%] | Actual speed range of holding section [mm/min] | Outside diameter fluctuation amount of elongated body [mm] |
|---|---|---|
| ±5 | 38–42 | ±3.2 |
| ±10 (when X1 = 10) | 36–44 | ±0.4 |
| ±25 (when X1 = 25) | 30–50 | ±0.3 |
| ±50 (when X1 = 50) | 20–60 | ±0.3 |
| ±100 (when X1 = 100) | 0–80 | ±0.3 |
| ±130 | 0–92 | ±2.5 |
| ±200 | 0–120 | diverged (not extendable) |

Here, if the target speed Vd is restricted such that |Vd−Ud| becomes less than 10% of the preset speed Ud (i.e., X1<10), the target speed Vd will attain a state where it hardly changes with respect to the preset speed Ud, whereby effective results will not be obtained by the control, thus increasing, on the contrary, the amount of change in outside diameter of the elongated body 1c manufactured. It refers to, for example, the case where X1=5 in expression (V), i.e., the target speed Vd is restricted such that (speed at 95% of the preset speed Ud)<(target speed Vd)<(speed at 105% of the preset speed Ud).

If the target speed Vd is restricted such that |Vd−Ud| exceeds 100% of the preset speed Ud (i.e., X1>100), on the other hand, the target speed Vd will be controlled to a value considerably far from the preset speed Ud, so that the control system will diverge (overshoot), whereby the outside diameter of the elongated body 1c manufactured will fail to converge at a predetermined value. It refers to, for example, the case where X1=105 in expression (V), i.e., the target speed Vd is restricted such that (speed at 0% of the preset speed Ud, i.e., 0)<(target speed Vd)<(speed at 205% of the preset speed Ud). It is apparent from the above-mentioned table that the amount of fluctuation in outside diameter of the elongated body 1c increases when X1 is set to a value less than 10 or exceeding 100.

Similarly, the target speed Vu of the second holding section is restricted so as to fall within the range represented by the following expression (VI). Since its influences are totally the same as those in the above-mentioned case of expression (V), detailed explanation will be omitted here.

$$(100-X2)Uu<100Vu<(100+X2)Uu \quad \text{(VI)}$$

Also, differential control or integral control can be carried out according to a value (R2/R1) or [(R2/R1)–1] obtained from the above-mentioned reference value R1 and actually measured value R2. For example, as for expressions (III) and (IV), there may be considered control expressions carrying out differential control and integral control, such as those indicated by the following expressions (VII) and (VIII), based on the value [(R2/R1)–1] obtained from the reference value R1 and actually measured value R2.

$$\left(\frac{Vd}{Ud}-1\right) = K1\frac{d}{dt}\left(\frac{R2}{R1}-1\right) + K2\left(\frac{R2}{R1}-1\right) + K3\int_{t_1}^{t_0}\left(\frac{R2}{R1}-1\right)dt \quad \text{(VII)}$$

$$\left(\frac{Vu}{Uu}-1\right) = -K1\frac{d}{dt}\left(\frac{R2}{R1}-1\right) - K2\left(\frac{R2}{R1}-1\right) - K3\int_{t_1}^{t_0}\left(\frac{R2}{R1}-1\right)dt \quad \text{(VIII)}$$

Here, K1, K2, and K3 are control coefficients (any constants within the ranges of K2>0, K1>0, and K3>0), $t_0$ is the current time, and $t_1$ is the integration starting time (how many seconds are subjected to integration theretofore). The restrictive meanings of the other individual symbols are the same as those in the cases of the above-mentioned expressions (I) to (IV).

In expression (VII), (VIII), the first, second, and third terms in the right side are terms corresponding to differential control, proportional control, and integral control, respectively. Here, a value of 0 may be given to K1 and K3. If K1 is set to 0 alone, the proportional control and integral control will be carried out. If K3 is set to 0 alone, the proportional control and differential control will be carried out. If both K1 and K3 are set to 0, only the proportional control will be carried out, so that K2=K, whereby expressions (VII) and (VIII) will equal expressions (III) and (IV), respectively.

When the differential control or integral control is thus carried out in addition to thee proportional control, the outside diameter of the elongated body 1c can be made more uniform.

Though FIG. 1 shows the state where the glass preform 1a is elongated while being arranged vertically, the glass preform 1a may be elongated while being arranged horizontally or while being rotated.

In the method of elongating a glass preform in accordance with the present invention, an electric furnace is employed in a heating section, a reference value R1 is set for the outside diameter, at a specific position, of a tapered region in the glass preform in the process of elongating, the actual outside diameter at the specific position is measured so as to acquire an actually measured value R2, and the speed of the first holding section and/or second holding section is controlled according to a value (R2/R1) obtained from the reference value R1 and actually measured value R2, whereby the glass preform can be precision-elongated with a favorable accuracy and a favorable manufacturing efficiency regardless of the glass preform outside diameter and the target elongated outside diameter. Also, for feeding back the control more rapidly in practice, it will be useful if the speed of the first holding section and/or second holding section is controlled according to a value [(R2/R1)–1] obtained from the reference value R1 and actually measured value R2.

From the foregoing explanation of the present invention, it will be obvious that the present invention may be varied in many ways. Such variations are not to be regarded as a departure from the spirit and scope of the present invention, and all such modifications as would be obvious to those skilled in the art are intended to be included within the scope of the following claims.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of elongating a glass preform comprising the steps of holding both ends of the glass preform with first and second holding sections, respectively; moving the first and second holding sections in a longitudinal direction of the glass preform with the moving speed of the first holding section faster than that of the second holding section; heating and softening the glass preform by a heating section successively from the end portion on the first holding section side as the first and second holding sections move in the longitudinal direction of the glass preform; and elongating the glass preform by a tensile force applied to the glass preform;

wherein an electric furnace is employed in said heating section, and said method further comprising the steps of:

setting a reference value R1 with respect to an outside diameter at a specific position in a tapered region of the glass preform in the process of elongating;

acquiring an actually measured value R2 which is an outside diameter at said specific position; and controlling the moving speeds of said first holding section and/or second holding section according to a value (R2/R1) obtained from said reference value R1 and actually measured value R2.

2. A method of elongating a glass preform according to claim 1, wherein said controlling steps is controlling the moving speed of said first holding section and/or said second holding section according to the following expression (I), (II):

$$Vd/Ud=(R2/R1)^K \quad \text{(I)}$$

$$Vu/Uu=(R2/R1)^{-K} \quad \text{(II)}$$

where

Vd is a target moving speed [mm/min] of the first holding section under control;

Ud is a preset moving speed [mm/min] of the first holding section;

Vu is a target moving speed [mm/min] of the second holding section under control;

Uu is a preset moving speed [mm/min] of the second holding section; and

K is a control coefficient (any positive constant).

3. A method of elongating a glass preform according to claim 2, wherein said control coefficient K is set to a value within the range of 50 to 500.

4. A method of elongating a glass preform according to claim 2, wherein the target moving speed Vd is restricted so as to fall within the range represented by the following expression (V):

$$(100-X1)Ud<100Vd<(100+X1)Ud \quad \text{(V)}$$

where X1 is any constant within the range of 10 to 100.

5. A method of elongating a glass preform according to claim 2, wherein the target moving speed Vu is restricted so as to fall within the range represented by the following expression (VI):

$$(100-X2)Uu<100Vu<(100+X2)Uu \qquad (VI)$$

where X2 is any constant within the range of 10 to 100.

6. A method of elongating a glass preform comprising the steps of holding both ends of the glass preform with first and second holding sections, respectively; moving the first and second holding sections in a longitudinal direction of th[0085] glass preform with the moving speed of the first holding section faster than that of the second holding section; heating and softening the glass preform by a heating section successively from the end portion on the first holding section side as the first and second holding sections move in the longitudinal direction of the glass preform; and elongating the glass preform by a tensile force applied to the glass preform;

wherein an electric furnace is employed in said heating section; and said method, further comprising the steps of:

setting a reference value R1 with respect to an outside diameter, at a specific position, of a tapered region in the glass preform in the process of elongating;

acquiring an actually measured value R2 which is an outside diameter at said specific position; and controlling the moving speeds of said first holding section and/or second holding section according to a value [(R2/R1)−1] obtained from said reference value R1 and actually measured value R2.

7. A method of elongating a glass preform according to claim 6, wherein said controlling steps is controlling the moving speed of said first holding section and/or said second holding section according to the following expression (III), (IV):

$$Vd/Ud=1+K[(R2/R1)-1] \qquad (III)$$

$$Vu/Uu=1-K[(R2/R1)-1] \qquad (IV)$$

where

Vd is a target moving speed [mm/min] of the first holding section under control;

Ud is a preset moving speed [mm/min] of the first holding section;

Vu is a target moving speed [mm/min] of the second holding section under control;

Uu is a preset moving speed [mm/min] of the second holding section; and

K is a control coefficient (any positive constant).

8. A method of elongating a glass preform according to claim 7, wherein said control coefficient K is set to a value within the range of 50 to 500.

9. A method of elongating a glass preform according to claim 7, wherein the target moving speed Vd is restricted so as to fall within the range represented by the following expression (V):

$$(100-X1)Ud<100Vd<(100+X1)Ud \qquad (V)$$

where X1 is any constant within the range of 10 to 100.

10. A method of elongating a glass preform according to claim 7, wherein the target moving speed Vu is restricted so as to fall within the range represented by the following expression (VI):

$$(100-X2)Uu<100Vu<(100+X2)Uu \qquad (VI)$$

where X2 is any constant within the range of 10 to 100.

* * * * *